(12) United States Patent
Gebers et al.

(10) Patent No.: US 8,069,711 B2
(45) Date of Patent: Dec. 6, 2011

(54) METHOD AND DEVICE FOR DETECTING MALFUNCTIONS OF ACTUATORS IN THE AIR SYSTEM ON INTERNAL COMBUSTION ENGINES

(75) Inventors: Michael Gebers, Commerce, MI (US); Joachim Wagner, Bad Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 12/228,522

(22) Filed: Aug. 12, 2008

(65) Prior Publication Data
US 2009/0049896 A1 Feb. 26, 2009

(30) Foreign Application Priority Data
Aug. 24, 2007 (DE) .......................... 10 2007 040 118

(51) Int. Cl.
*G01M 15/04* (2006.01)
(52) U.S. Cl. ................ 73/114.74; 73/114.36; 73/114.39
(58) Field of Classification Search ............... 73/114.31, 73/114.32, 114.36, 114.39, 114.69, 114.74
See application file for complete search history.

(56) References Cited

U.S. PATENT DOCUMENTS

| | | | |
|---|---|---|---|
| 6,687,601 B2* | 2/2004 | Bale et al. ...................... 701/108 |
| 6,701,245 B2* | 3/2004 | Birkner et al. ................ 701/108 |
| 6,763,708 B2* | 7/2004 | Ting et al. ................... 73/114.74 |
| 6,799,454 B2* | 10/2004 | Birkner et al. .............. 73/114.74 |
| 6,850,834 B1* | 2/2005 | Yu et al. ......................... 701/108 |
| 6,904,792 B2* | 6/2005 | Wakahara ................... 73/114.39 |
| 6,944,530 B2* | 9/2005 | Russell et al. ................. 701/104 |
| 7,055,375 B2* | 6/2006 | Ishikawa ......................... 73/49.7 |
| 7,100,586 B2* | 9/2006 | Matsumoto .............. 123/568.16 |
| 7,104,259 B2* | 9/2006 | Terada ...................... 123/568.16 |
| 7,107,978 B2* | 9/2006 | Itoyama ......................... 123/683 |
| 7,267,117 B2* | 9/2007 | Tonetti et al. .................. 123/704 |
| 2005/0125139 A1* | 6/2005 | Keller et al. ................... 701/114 |
| 2007/0095131 A1* | 5/2007 | Takayama ....................... 73/116 |
| 2008/0035117 A1* | 2/2008 | Schurz et al. .................. 123/478 |

* cited by examiner

*Primary Examiner* — Eric S McCall
(74) *Attorney, Agent, or Firm* — Kenyon & Kenyon LLP

(57) ABSTRACT

A method and a device for detecting faulty functioning of actuators in the air system on internal combustion engines, an actuator being operated using at least two control states, one after the other, at least one sensor, whose output signal is a function of the excursion state of the actuator, reading out the output signal of this sensor being undertaken, and an assessment of the function of the controlled actuator being undertaken from the response of this output signal to the change of the control of the actuator, during the control of the actuator, at least the control of those other actuators included in the air system being kept constant as well as additional control signals for operating the internal combustion engine, which have an influence on the output signal of the sensor.

11 Claims, 2 Drawing Sheets

METHOD AND DEVICE FOR DETECTING MALFUNCTIONS OF ACTUATORS IN THE AIR SYSTEM ON INTERNAL COMBUSTION ENGINES

RELATED APPLICATION INFORMATION

The present application claims priority to and the benefit of German patent application no. 10 2007 040 118.5, which was filed in Germany on Aug. 24, 2007, the disclosure of which is incorporated herein by reference.

FIELD OF THE INVENTION

The present invention relates to a method for ascertaining malfunctions of actuators in the air system on internal combustion engines, as well as a device for carrying out the method.

BACKGROUND INFORMATION

A plurality of mechanical actuators is used in motor vehicles, using which different operating parameters of the vehicle may be influenced. In order to ensure their performance reliability, these actuators have to be able to be checked. However, based on the increasing complexity of systems and components used in vehicles, a great depth of diagnostics is required for this. Fuel injection systems as well as the air system and the exhaust system of a vehicle without a doubt constitute a diagnosis area of concentration in this regard.

Malfunctions of actuators in the air system on internal combustion engines frequently lead, in an unrecognized manner, to an undesired performance reduction, increased fuel consumption, an overproportional increase in pollutant emissions as well as an increase in the wear of various assemblies during the operation of the internal combustion engine. In individual cases, the internal combustion engine may fail altogether. For this reason, methods are required for safely diagnosing possibly undetected malfunctions of actuators in the air system. This necessity comes about also with a view as to rising labor costs as well as the increasing complexity of assemblies used in motor vehicles which, when a fault in an individual assembly is not detected, may possibly have to be entirely replaced. Actuators in the air system of an internal combustion engine are located at various places and in different ways they influence the method of functioning of the entire system, this influence, as a rule, taking place in a manner not decoupled from the influence of other actuators in the air system. It is this circumstance that additionally complicates the search for faults with respect to malfunctions of actuators in the air system. At this time, and for that reason, reliable methods are not available for the detection of a defective, sticking or not completely closing actuator in the air system. Such actuators are located, for example, at the control flap (RKL), in the form of an exhaust gas recirculating valve (AGR), a swirl flap (EKAS) or for operating a turbocharger (VTG and WG). The actuators installed there may be restricted in their performance reliability or may fail completely, in the course of their operating life, for instance, by rusting or by wear.

Methods for diagnosing such functioning disturbances are based, these days, only on a simple motion test, in which the respective actuator is opened all the way and is subsequently closed again all the way. If possible, this motion test is supplemented by sight inspection, for a proper judgment of which, however, a good deal of experience is required if statements are to be made that go beyond the mere reaching of the end positions. A further possibility for fault analysis, during such a motion test, is in judging the noise emitted in each case by the internal combustion engine, for which, however, a lot of experience is also required, a subjective component always remaining, which the assessing person is never able to exclude. Indirect methods for assessing the functioning of actuators in particular, that is, for instance, noise analysis, always take place on the overall system, in this context, that is, a functional disturbance of an actuator to be analyzed, will have different effects as a function of the operating conditions under which the internal combustion engine is being operated, whereby in an analysis carried out in such a way, ambiguities may possibly remain which additionally make the fault diagnosis more difficult. It is possible, in particular, that a fault, that is to be diagnosed, is able to have different effects under different operating conditions, and this may lead to a wrong diagnosis.

SUMMARY OF THE INVENTION

One aspect of the exemplary embodiments and/or exemplary methods of the present invention relates to detecting malfunctions of actuators in the air system of an internal combustion engine by a continuous or a discrete bringing up of at least two control states of the respective actuator that is to be checked, other operating states of the air system and of the internal combustion engine being kept constant. This means a deviation from the usual way of controlling various actuators, during the normal operation of the internal combustion engine, their function being usually adjusted to one another as a rule, and being supposed to assure optimal operation of the internal combustion engine, especially as a function of various driver command requests and/or torque requests. During the diagnosis, that is, during the control of the actuators that is to be investigated, the change in the output signal of at least one sensor, that is required for the operation of the internal combustion engine, is evaluated. Thus, the method provokes a system response, made up of the air system and the internal combustion engine, at controls that are kept constant and operating states of the internal combustion engine and additional actuators included in the system, the exclusive variation being the control of the actuator that is to be diagnosed. Access to this system response takes place via a sensor that may be included in the system anyway, and is required outside the diagnostic method for operating the internal combustion engine.

Thus, the exemplary embodiments and/or exemplary methods of the present invention relates at least to a method for detecting malfunctions of actuators in the air system on internal combustion engines, in which an actuator is operated using at least two control states, one after the other, on at least one sensor, whose output signal is a function of the excursion state of the actuator, the reading out of the output signal of this sensor being undertaken and, from the response of this output signal to the change in the control of the actuator, an assessment is made of the functioning of the controlled actuator, and during the control of the actuator that is to be checked, at least the control of those other actuators included in the air system as well as additional control signals for operating the internal combustion engine, that have an influence on the output signal of the sensor, being kept constant.

Numerous advantages come about because of the method according to the present invention, it being emphasized particularly that it makes possible an objective and reliable diagnosis of actuators of the air system in internal combustion engines, since the kind of subjective judgment criteria used up to now may be omitted to a great extent. Great reproducibility of the diagnosis method is connected with this. The effort in assessing possibly fault-afflicted actuators is considerably reduced, since a system expansion of the components that are to be diagnosed is no longer required. Furthermore, there basically exist no restrictions on special injection systems conditioned on principle. An additional advantage is that obtaining the required output signal of a sensor can be done with the aid of standard installed sensors in a motor vehicle, that is, for instance, using a hot film air mass meter (HFM), a boost pressure sensor (LDF) and/or a lambda probe (LSU). Additionally or alternatively, temporarily installed probes may naturally also be used.

Carrying out the method according to the present invention requires at least one device for detecting malfunctions of actuators in the air system of the internal combustion engine, the arrangement for keeping constant the operating state of the internal combustion engine, as well as actuators included in the air system with the exception of the actuator that is to be checked, an arrangement for the defined activation of the actuator that is to be checked, an arrangement for reading out the output signal of at least one sensor, whose output signal depends on the excursion of the actuator that is to be checked, as well as an arrangement for the functional analysis of the controlled actuator, based on the response read out of the at least one sensor to a defined control of the actuator that is to be checked.

The exemplary embodiments and/or exemplary methods of the present invention are explained below, using one exemplary embodiment.

DETAILED DESCRIPTION

Figure 1:
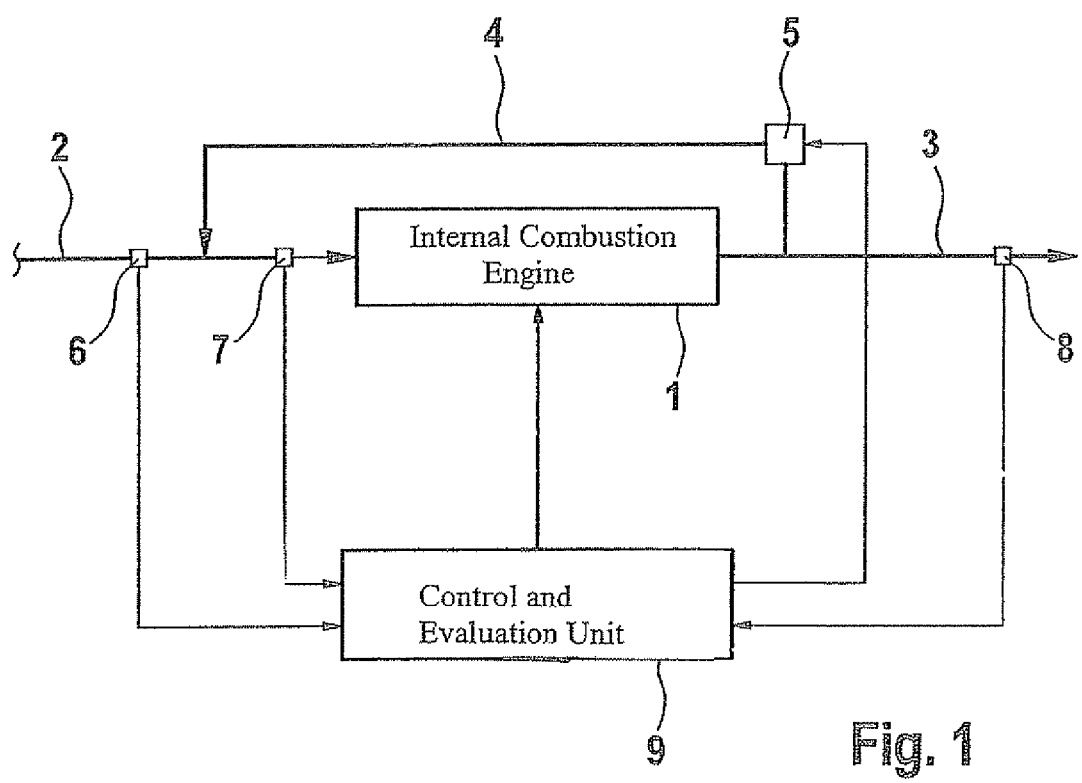
FIG. 1 shows a simplified schematic representation of a device for carrying out the method according to the present invention.

FIG. 1 shows a simplified schematic representation of a device for carrying out the method according to the present invention. In it, an internal combustion engine is embedded in an air system that is known per se. This includes at least one flow path 2 for supplying the combustion air required for the operation of internal combustion engine 1, a flow path 3 leading away from internal combustion engine 1, which is used essentially for guiding away the exhaust gas of internal combustion engine 1, and a flow path 4 via which, in differently great measure, an at least partial recirculating of the exhaust gas can take place, and its introduction into flow path 2 for the supply of fresh combustion air. The control of the proportion of the exhaust gases to be recirculated, and thus the control of the ratio of the aspirated fresh air and the admixed exhaust gas quantity is performed via an exhaust gas recirculating valve 5.

This exhaust gas recirculating valve 5 represents an actuator within the meaning of the exemplary embodiments and/or exemplary methods of the present invention whose reliable functioning is of great meaning for the regulated operation of respective internal combustion engine 1, and whose function is made accessible by the diagnostic method according to the present invention, without having to undertake a costly system expansion. The air system shown, having the three flow paths 2, 3, 4 further includes three sensors, which supply input variables for an engine control unit and other control units, for the regulated operation of internal combustion engine 1, during the regular operation of internal combustion engine 1.

These sensors are particularly an air mass sensor 6 situated in the intake region for fresh air, a boost pressure sensor 7 situated near the introduction of the combustion air into the cylinders in internal combustion engine 1, as well as a lambda probe 8 on the exhaust gas side in flow path 3 of the exhaust gas system, for determining the partial pressure of oxygen in the exhaust gas flow of internal combustion engine 1. Boost pressure sensor 7 is especially necessary since, when a so-called turbocharger is used, a considerable deviation may occur between the environmental air pressure and the pressure of the supplied combustion air, and since knowing the environmental air pressure alone is not sufficient for the correct determination of size of the cylinder charge.

The output signals of the three sensors 6, 7, 8 are supplied to a control and evaluation unit 9, in which the recording of the output signals and the continuing processing and evaluation is able to take place. Control and evaluation unit 9 is especially in a position to generate a control signal and to apply an actuator that is to be diagnosed which, in the present exemplary embodiment, is exhaust gas recirculating valve 5. Moreover, control and evaluation unit 9 has an arrangement for keeping constant the operating state of internal combustion engine 1, with the exception of the variable control of the actuator, namely, exhaust gas recirculating valve 5.

This keeping constant also includes the constant control of additional actuators that are not shown, which may be included in the air system, but are not instantaneously the subject of the diagnosis. Thus, if a control signal is applied to exhaust gas recirculating valve 5, by which the opening state of this exhaust gas recirculating valve 5 changes, and if, furthermore, as already shown, internal combustion engine 1 is operated under otherwise constant operating conditions, this will lead, in the output signal of individual sensors 6, 7 and/or 8, to an evaluable response to the change of the opening state of exhaust gas recirculating valve 5, from which the functioning of exhaust gas recirculating valve 5, that is, its reaction to changed control signals, may be derived.

An actual response to a change in the opening state of an actuator will be known regularly, in which the functioning provided by the manufacturer of the actuator, that is to be diagnosed, is reflected. If deviations occur, which are of the output signal of the respectively observed sensor, from this actual response, then this points to a fault in the functional behavior of the diagnosed actuator, which may be correspondingly protocolled and indicated if the deviation exceeds a threshold value. Control and evaluation unit 9 may be designed as a part of the engine control unit, which may be connected via appropriate interfaces to diagnostic tools. Alternatively, control and evaluation unit 9 may also be accommodated in a separate diagnostic unit which is connected to the motor vehicle only for checking purposes.

Figure 2:
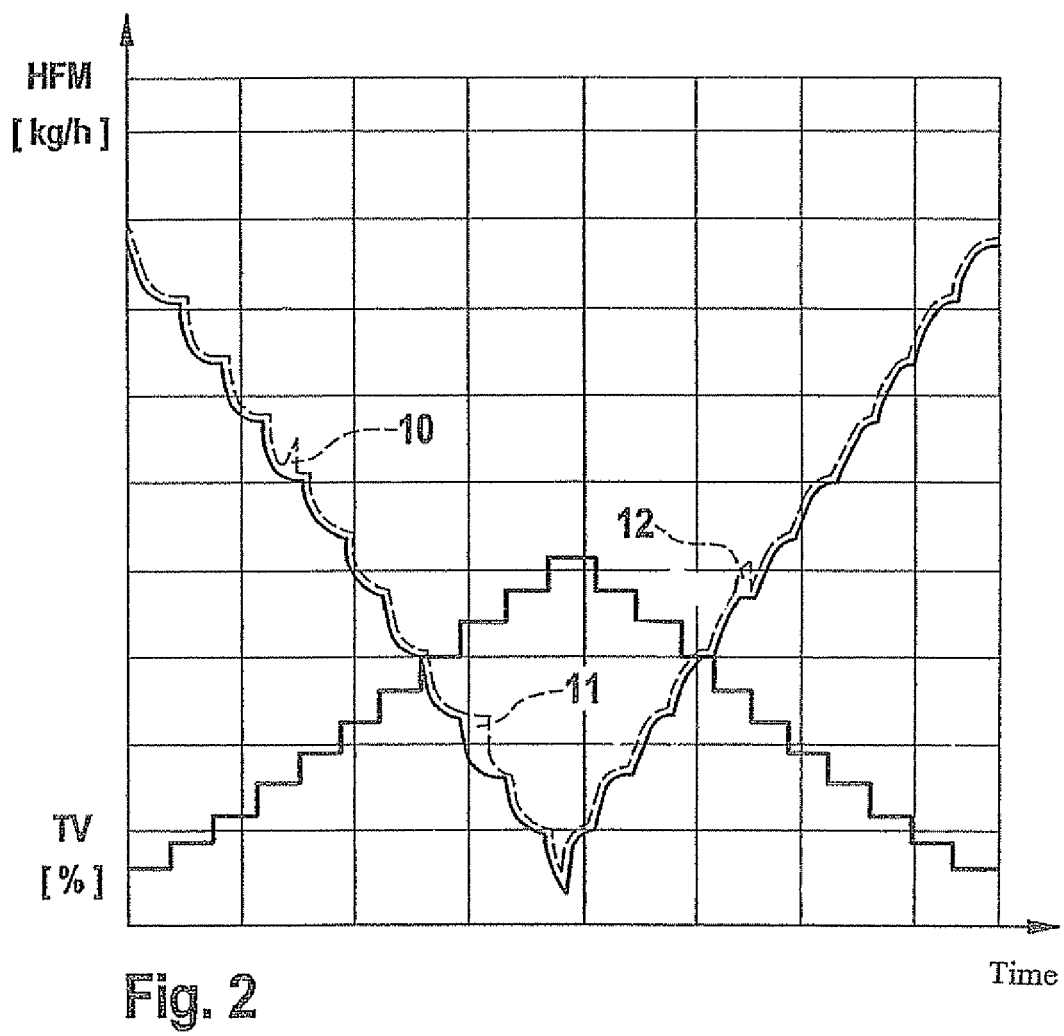
FIG. 2 shows a diagram to clarify the connections between the control of an actuator that is to be diagnosed and a response signal with respect to this at a sensor used for carrying out the method.

FIG. 2 shows a diagram to clarify the connections between the control of an actuator that is to be diagnosed and a response signal with respect to this at a sensor used for carrying out the method. Exhaust gas recirculating valve 5 was selected as the actuator that is to be diagnosed. In order to effect various opening states of exhaust gas recirculating valve 5, a control signal is applied having a variable pulse duty factor. The change in pulse duty factor TV takes place in discrete steps, between which a brief plateau phase is kept in each case.

This yields the stair-shaped curve shown. The variation of pulse duty factor TV takes place, in this context, in an area between a minimum value and a maximum value. A pulse duty factor TV at which exhaust gas recirculating valve 5 is completely closed is used as the minimum value. To simplify matters in this instance, a control may be entirely omitted, which corresponds to a pulse duty factor TV of 0%. A pulse duty factor TV, in which a constructively conditioned complete opening of exhaust gas recirculating valve 5 sets in, is used as a maximum, if the latter is working free from faults.

The entire range between the minimum value and the maximum value of pulse duty factor TV is run through in both directions, whereby, independently of each other, the opening and closing behavior of exhaust gas recirculating valve 5 is inferred, and possibly occurring hysteresis effects, which would point to partial functional disturbances as a function of the trend of the control and the degree of opening of exhaust gas recirculating valve 5, are able to be recorded securely.

Air mass sensor 6 in the form of a hot film air mass meter (HFM) is used to carry out the method. It generates, as output signal, a proportional signal to the air mass flow that passes air mass meter 6. The air mass flow is a function of the operating state of internal combustion engine 1, especially of its rotational speed and possibly of the degree of loading during the operation of a turbocharger, as well as the proportion of exhaust gas of internal combustion engine 1 introduced into the combustion air. If, according to the exemplary embodiments and/or exemplary methods of the present invention, the operating state of internal combustion engine 1 is set to be constant during the carrying out of the diagnostic method according to the exemplary embodiments and/or exemplary methods of the present invention, and as a possible change, only the change in the control of the actuator that is to be diagnosed, i.e. exhaust gas recirculating valve 5, is released, then the air mass flow that passes air mass sensor 6 is a function still only of the opening state of exhaust gas recirculating valve 5.

The clear dependence thus setting in between the output signal of air mass sensor 6 and the opening state of exhaust gas recirculating valve 5 makes it possible to ascertain the type of dependence between the opening state of exhaust gas recirculating valve 5 and the control signal present at exhaust gas recirculating valve 5, in the case at hand, that is, pulse duty factor TV. An actual dependence, which has to be present in the case of fault-free functioning of exhaust gas recirculating valve 5, is known from specifications and constructive circumstances. The recording according to the exemplary embodiments and/or exemplary methods of the present invention of the actual dependence of the opening state of exhaust gas recirculating valve 5 of pulse duty factor TV present makes possible a problem-free recording of possible deviations from the actual dependence, and a first allocation of such deviations to faults occurring in the opening behavior of exhaust gas recirculating valve 5.

The output signal of air mass sensor 6 thus reflects a system response to a change in the control of the actuator that is to be diagnosed, and among the presuppositions of this is keeping constant all additional variables having an influence on the operating state of internal combustion engine 1, which influence the output signal of the air mass sensor. This system response may be analyzed especially advantageously by a change between discrete changes in the control signal and subsequent plateau phases. An exact knowledge of the reaction of the respective actuator to relatively small changes in the control signal, during already existing partial level controls, is particularly required for a fault-free operability of internal combustion engines controlled in a complex manner, and this is only to be achieved by the method according to the present invention.

During the changing of the control, that is, of pulse duty factor TV of an actuator based on an actuator fault, such as a sticking exhaust gas recirculating valve 5, if too great or too small a change of a value measured using a sensor is determined, for instance, in the form of an HFM signal, either a fault may be signaled or a fault counter may be incremented, which then, in turn, signals a fault when a specified value is exceeded, which may require the exchange of the faulty actuator, if necessary.

In the exemplary embodiment, a filtered output signal (shown as a dashed line) of air mass sensor 6 is evaluated, which may be advantageous for decoupling vibrations and/or electronic interference.

The filtering, in this context, takes place in such a way that it ensures that a response to a change in the control of exhaust gas recirculating valve 5 taking place in the output signal of air mass sensor 6 remains able to be recorded quantitatively and qualitatively. In the case of the exemplary discrete change in the control, this shows in a clear weakening of the respective change of the output signal of air mass sensor 6 at the end of the respective plateau phase of pulse duty factor TV. For the sake of a comparison, the ideal curve or setpoint curve of the output signal of air mass sensor 6 is shown by a solid line. Curve areas of the output signal actually measured, which point to forward swing 10, a delayed valve response 11 or an overshooting 12 of exhaust gas recirculating valve 5, are consequently easy to detect and are to be associated with the pulse duty factor.

Alternatively to the exemplary embodiment shown, the change in control of the actuator that is to be checked, that is, for example, pulse duty factor TV, may also be varied continuously without plateau phases, without curves appropriately tailored to special functional faults. The exemplary procedure is transferable without major changes to the checking of an actuator at a control flap, a swirl flap and/or at a turbocharger.

By the correlation and evaluation of at least two sensors, it is conceivable also to be able to make a statement concerning the system behavior or the behavior of the components, as well as to increase the certainty of the diagnosis.

What is claimed is:

1. A method for detecting a malfunction of a first actuator in an air system of an internal combustion engine having at least one actuator, in which the first actuator is transitioned between at least two control states, one after an other, the method comprising:
   performing a reading at at least one sensor, whose output signal is a function of an excursion state of the first actuator;
   making an assessment of a functioning of the first actuator from a change in the output signal responsive to the transition;
   continuously evaluating the change in the output signal of the at least one sensor as the first actuator is transitioned to measure change in the output signal during the transition of the first actuator between the control states; and
   holding constant, during the transition, the control of the other actuators that are included in the air system, as well as additional control signals for operating the internal combustion engine which have an influence on the output signal of the sensor.

2. The method of claim 1, wherein a pulse duty factor for controlling the actuator is changed during the control of the actuator.

3. The method of claim 1, wherein the control is changed continuously from a minimum value representing a maximum closed state of a valve of the actuator to a maximum value representing a maximum open state of the valve during the control of the actuator.

4. The method of claim 1, wherein the control is changed in discrete steps from a minimum value representing a maximum closed state of a valve of the actuator to a maximum value representing a maximum open state of the valve during the control of the actuator.

5. The method of claim 1, wherein the control is changed from a minimum value representing a maximum closed state of a valve of the actuator to a maximum value representing a maximum open state of the valve and back again during the control of the actuator.

6. The method of claim 1, wherein, during the control of the at least one actuator, the output signals of a plurality of sensors are analyzed as to the response of the output signal of a respective sensor to the control of the at least one actuator.

7. The method of claim 6, wherein the output signal is the output signal of at least one of (i) at least one air mass sensor, (ii) one lambda probe, and (iii) one boost pressure sensor, and wherein the output signal is measured and evaluated.

8. The method of claim 1, wherein the control of the actuator is performed at at least one of (i) a control flap, (ii) an exhaust gas recirculating valve, (iii) a swirl flap, and (iv) a turbocharger.

9. The method of claim 1, wherein the response to the control of the at least one actuator obtained from the output signal of the at least one sensor is compared to a setpoint response and a fault message is emitted if a deviation of an ascertained response from the setpoint response exceeds a threshold value.

10. A control unit for detecting a faulty functioning of an actuator in an air system of an internal combustion engine having at least one actuator, comprising:
   an operating arrangement to operate a first actuator, the actuator being operated using at least two control states, one after the other;
   a read out arrangement to read out at at least one sensor, whose output signal is a function of an excursion state of the first actuator; and
   a control arrangement to assess a functioning of the first actuator from a change in the response of the output signal responsive to the transition, continuously evaluating the change in the output signal of the at least one sensor as the first actuator is transitioned to measure change in the output signal during the transition of the first actuator between the control states, and holding constant, during the transition, the control of the other actuators included in the air system and further control signals for operating the internal combustion engine, which have an influence on the output signal of the sensor.

11. An engine system, comprising:
   a plurality of actuators and at least one sensor that are situated in an air system of an internal combustion engine having at least one actuator; and
   a control unit for detecting a faulty functioning of the at least one actuator in the air system of the internal combustion engine, including:
   an operating arrangement to operate a first actuator, the actuator being operated using at least two control states, one after the other;
   a read out arrangement to read out at at least one sensor, whose output signal is a function of an excursion state of the first actuator; and
   a control arrangement to assess a functioning of the first actuator from a change in the response of the output signal responsive to the transition, continuously evaluating the change in the output signal of the at least one sensor as the first actuator is transitioned to measure change in the output signal during the transition of the first actuator between the control states, and holding constant, during the transition, the control of the other actuators included in the air system and further control signals for operating the internal combustion engine, which have an influence on the output signal of the sensor.

* * * * *